US010496263B2

(12) United States Patent
So et al.

(10) Patent No.: US 10,496,263 B2
(45) Date of Patent: Dec. 3, 2019

(54) DE-ANONYMIZATION OF WEBSITE VISITOR IDENTITY

(71) Applicant: JPMorgan Chase Bank, N.A., New York, NY (US)

(72) Inventors: Boris T. H. So, NT (HK); Jacky C. T. Chan, Ho Man Tin (HK)

(73) Assignee: JPMORGAN CHASE BANK, N.A., New York, NY (US)

(*) Notice: Subject to any disclaimer, the term of this patent is extended or adjusted under 35 U.S.C. 154(b) by 220 days.

(21) Appl. No.: 15/397,368

(22) Filed: Jan. 3, 2017

(65) Prior Publication Data

US 2018/0188932 A1    Jul. 5, 2018

(51) Int. Cl.
*G06F 3/048* (2013.01)
*G06F 3/0484* (2013.01)
*H04L 29/06* (2006.01)

(52) U.S. Cl.
CPC ........ *G06F 3/04847* (2013.01); *H04L 63/083* (2013.01); *H04L 63/0876* (2013.01)

(58) Field of Classification Search
CPC .. G06F 3/0481; G06F 3/04847; H04W 12/06; H04W 12/00503; H04L 63/83; H04L 63/0876
See application file for complete search history.

(56) References Cited

U.S. PATENT DOCUMENTS

| 6,734,886 | B1* | 5/2004 | Hagan | G06F 21/6254 707/E17.109 |
| 8,019,881 | B2* | 9/2011 | Sandhu | G06F 21/6263 709/203 |
| 9,203,905 | B1* | 12/2015 | Hong | H04L 67/14 |
| 2007/0255821 | A1* | 11/2007 | Ge | G06Q 10/00 709/224 |
| 2010/0057843 | A1* | 3/2010 | Landsman | H04L 63/0407 709/203 |
| 2011/0251823 | A1 | 10/2011 | Davis et al. | |
| 2013/0290700 | A1 | 10/2013 | Davis et al. | |
| 2014/0280287 | A1* | 9/2014 | Ganti | G06F 16/248 707/766 |
| 2016/0142380 | A1 | 5/2016 | Fuller et al. | |

* cited by examiner

*Primary Examiner* — Matthew Ell
(74) *Attorney, Agent, or Firm* — Greenblum & Bernstein, P.L.C.

(57) ABSTRACT

Embodiments of the present invention provide a method and system for de-anonymization of online user identity, user tracking techniques, user behavior and preference analysis, customization of user interfaces, and combinations thereof. Fingerprinting attributes may be collected from a client device during anonymous browsing to identify the user, and based on tracked activities from the browsing session, a user profile for that user may be created and/or updated. When a user using the client device with the same fingerprinting attributes initiates a login session, the information from the stored user profile may be used to create a customized user interface.

17 Claims, 7 Drawing Sheets

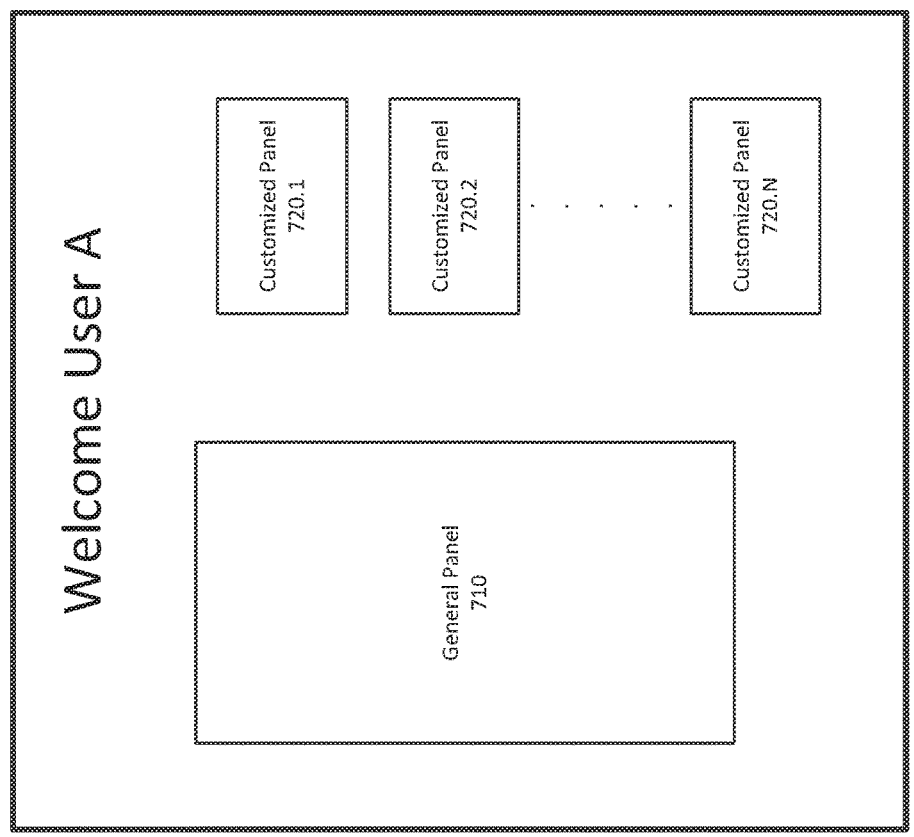

DE-ANONYMIZATION OF WEBSITE VISITOR IDENTITY

FIELD OF THE INVENTION

Embodiments of the present invention are generally related to systems and methods for de-anonymization of website visitors, tracking website browsing activities, and creating customized user interfaces.

BACKGROUND OF THE INVENTION

Content providers generally can provide two ways of online access: public and restricted. For restricted access, users typically enter in user credentials, and after verification of the user credentials, users can gain access to the restricted information on a website. Because the user has to enter in his or her credentials, the content provider can identify the user and associate user activities on the website with the identified user. However, when users access a public website, they generally do so anonymously (i.e., without logging in with user credentials). As such, there is an internet-centric problem of associating user activities to a particular user when users are anonymously browsing a public website.

One conventional approach is to use persistence browser cookies for user tracking. This technique often requires saving identifier data on the client's machine, which may still be considered invasive by some users. Further, a browser cookie is not a true representation of the machine's identity. If the cookie is removed or copied to another machine, a tracking system will not be able to reconcile the disparate information.

Another conventional approach is to use Internet Protocol (IP) addresses. However, in the world of mobile computing, IP addresses are not reliable to track users since IP addresses change with location.

Accordingly, the inventors recognized a need in the art for a technical solution directed to de-anonymization of online users to track user activity and to create customized user interfaces based on the use activity to provide a better, more personalized online experience to the user.

SUMMARY OF THE INVENTION

Embodiments of the present invention may provide an analytics server including a computer memory and a processor. The computer memory may store instructions and user profiles. The processor may execute the stored instructions in the computer memory and perform a series of steps. The steps may include receiving collected device fingerprint attributes from a client device over a network when the client device browses a website without entering user credentials and comparing the device fingerprint attributes to stored user profiles. If the device fingerprint attributes match a stored user profile, the processor may associate a current browsing session with the matched user profile. If the device fingerprint attributes do not match a stored user profile, the processor may create a new user profile and associating the current browsing session with the new user profile. The steps may also include tracking user activity in the current browsing session, deriving user preferences from the tracked user activities, and storing the user preferences in the associated user profile to be used to create a customized user interface for a user login session, wherein the login session is initiated by the user inputting user credentials.

Embodiments of the present invention may provide a device including an input device, a processor, and a display. The input device may be used to enter a first request for browsing a website without entering user credentials and a second request for browsing the website with entering user credentials. The processor, in a browsing session related to the first request, may transmit fingerprint attributes of the device over a network. The fingerprint attributes may be stored in a user profile. The display, in a browsing session related to the second request, may display a customized user interface based on the user profile.

Embodiments of the present invention may provide a method for a first browsing session. The method may include receiving collected device fingerprint attributes from a client device over a network when the client device browses a website without entering user credentials and comparing the device fingerprint attributes to stored user profiles. If the device fingerprint attributes match a stored user profile, then associating a current browsing session with the matched user profile. If the device fingerprint attributes do not match a stored user profile, then creating a new user profile and associating the current browsing session with the new user profile. The method may also include tracking user activity in the current browsing session, deriving user preferences from the tracked user activities, and storing the user preferences in the associated user profile to be used to create a customized user interface for a user login session, wherein the login session is initiated by the user inputting user credentials.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 7 is an illustration of a website screen in accordance with an embodiment of the present invention.

DETAILED DESCRIPTION OF THE INVENTION

Embodiments of the present invention provide a method and system for de-anonymization of online user identity, user tracking techniques, user behavior and preference analysis, customization of user interfaces, and combinations thereof. Embodiments of the present invention may utilize fingerprinting to collect identity information and backend analytics to infer relationship between browsing history and user profile. Embodiments of the present invention may also utilize cookies in addition to fingerprinting to determine relationships between browsing history and user profile.

Figure 1:
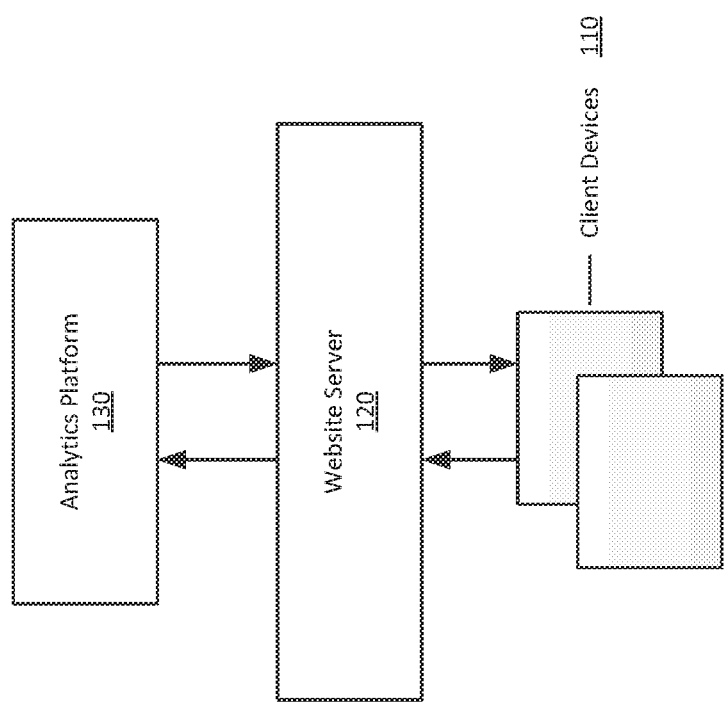
FIG. 1 is a block diagram illustrating an operating environment for an analytics system in accordance with an embodiment of the present invention.

FIG. 1 is a block diagram illustrating an operating environment for operation of an analytics system in accordance with an embodiment of the invention. The analytics system may include a plurality of client devices 110, a website server 120, and an analytics platform 130. Additional systems or devices may be included in the operating environment.

The client devices 110 may be provided as a computing device such as a computer, laptop, tablet, etc. The client devices 110 may also be provided as mobile devices including, but not limited to, mobile smartphones, such as Android® phones and iPhones®, tablets, or hand-held wireless devices such as PDAs, multiprocessor systems, microprocessor-based or programmable consumer electronics, minicomputers, other handheld devices that may now be available or may in the future become available. These client devices 110 may provide access to one or more websites provided by the website server 120, utilizing a browser or a downloadable app supplied for use for the website.

The client devices 110 may be communicatively connected to the website server 120 via a communication link. The communication link may be provided by one or more networks, such as the Internet. The network may include a wired or wireless local area network (LAN) and a wide area network (WAN), wireless personal area network (PAN) and other types of networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The website server 120 may interact with the plurality of client devices 110, and may manage delivery of website information to and from the client devices 110 in accordance with embodiments of the present invention as described below. In an embodiment, the website server 120 may provide one or more websites. In an embodiment, the website server 120 may be provided as a plurality of servers each providing one or more websites.

The website server 120 may also collect fingerprinting attributes from the client devices 110. The collection may be done passively and without any express actions taken by users. The website server 120 may also be communicatively connected to the analytics platform 130. In an embodiment, the analytics platform 130 may be integrated with the website server 120.

Figure 2:
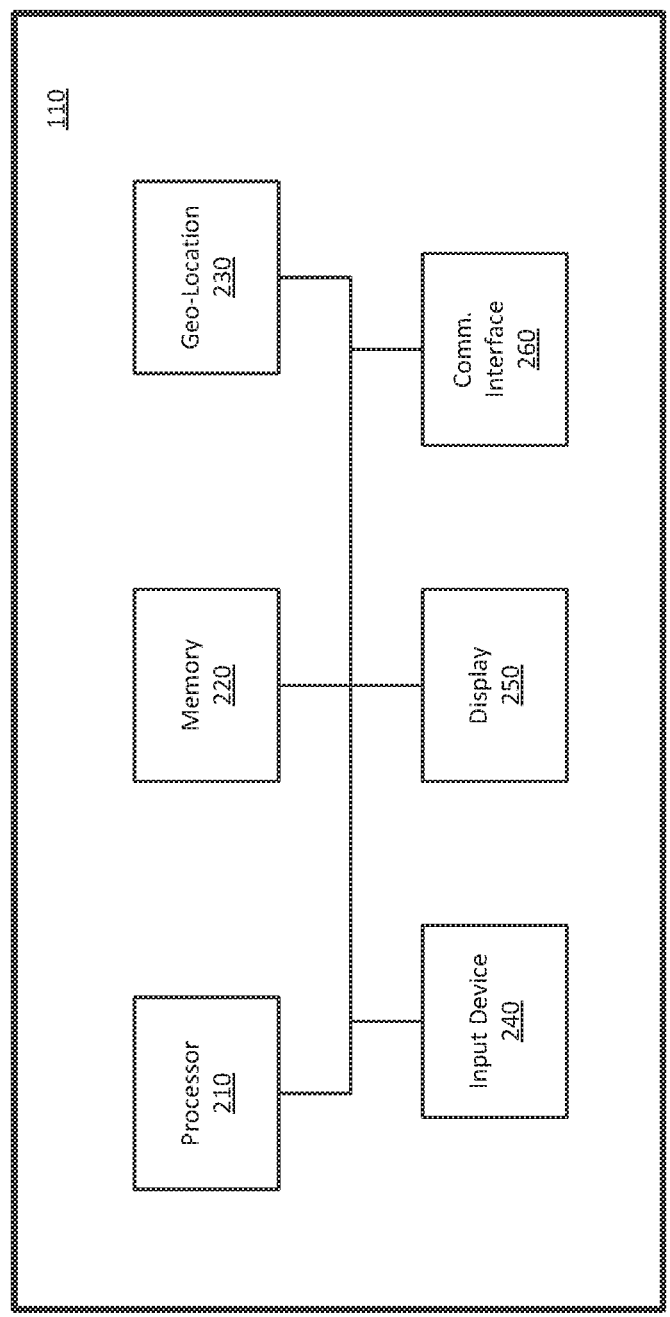
FIG. 2 is a block diagram of a user device in accordance with an embodiment of the present invention.

FIG. 2 illustrates a client device 110 in accordance with an embodiment of the present invention. The client device 110 may include a processor 210, a memory 220, a geo-location device 230, an input device 240, a display 250, and a communication interface 260. The memory 220 may include, for example, applications, a browser, etc. The geo-location device 230 may provide a current location of the client device 110. In an embodiment, the geo-location device may be provided as a global position system (GPS) device. The input device 240 may allow the user to enter information into the user device 110. In an embodiment, the input device 240 may be provided as a keyboard, a mouse, touch screen sensors, a microphone for voice commands, or any other suitable device that would allow the user to interact with the client device 110. The communication interface 260 may allow the user interface 110 to communicate (e.g., transmit and receive messages) with the website server 120 over a network.

In an embodiment, the client device 110 may interact with the website server 120 using a browser. Alternatively, the client device 110 may interact with the website server 120 using a software application or mobile application. In embodiments of the invention, the website provided by the website server 120 may cause the client device 110 to access one or more URLs. In an embodiment, the website may provide the ability to automatically take actions based on notifications or other pushed data.

Figure 3:
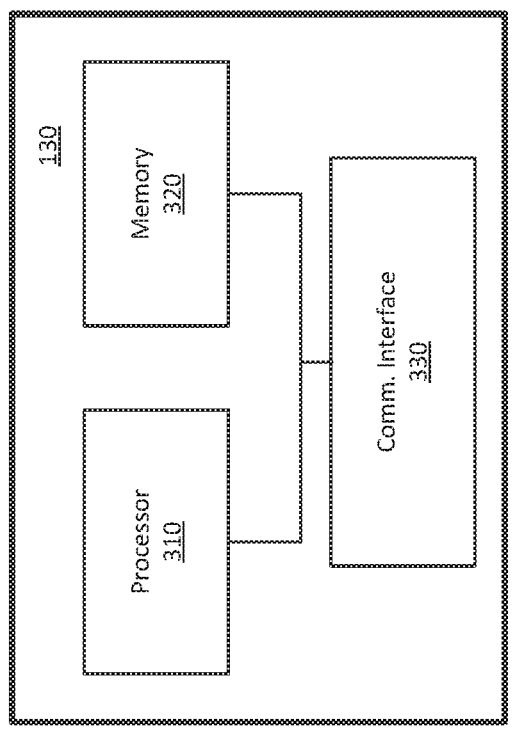
FIG. 3 is a block diagram of an analytics server in accordance with an embodiment of the present invention.

FIG. 3 illustrates the analytics platform 130 in accordance with an embodiment of the present invention. The analytics platform 120 may include a processor 310, memory 320, and a communication interface 330 The memory 320 may include an analytics program connected with a storage element. The processor 310 may execute various algorithms from the analytics program as will be further described below. The memory 320 may store data such as user profiles. This data may be structured, semi-structured, or unstructured. The data storage areas in the memory 320 may include file systems and databases for storing large amounts of data. Data stored in the memory 320 may be managed and communicated with an Object-Relational Database Management System, as known in the art. The memory 320 may include multiple data storage areas, which may have different structures and store different types of data. For example, unstructured data may be stored separately from cleansed and structured data.

The communication interface 330 may be used for communicating with the website server 120 (or client devices 110, for example, in the embodiment where the analytics platform 130 is integrated with the website server 120) and other systems over a network. In an embodiment, the analytics platform 130 may also include a user interface to allow viewing and direct input.

Figure 4:
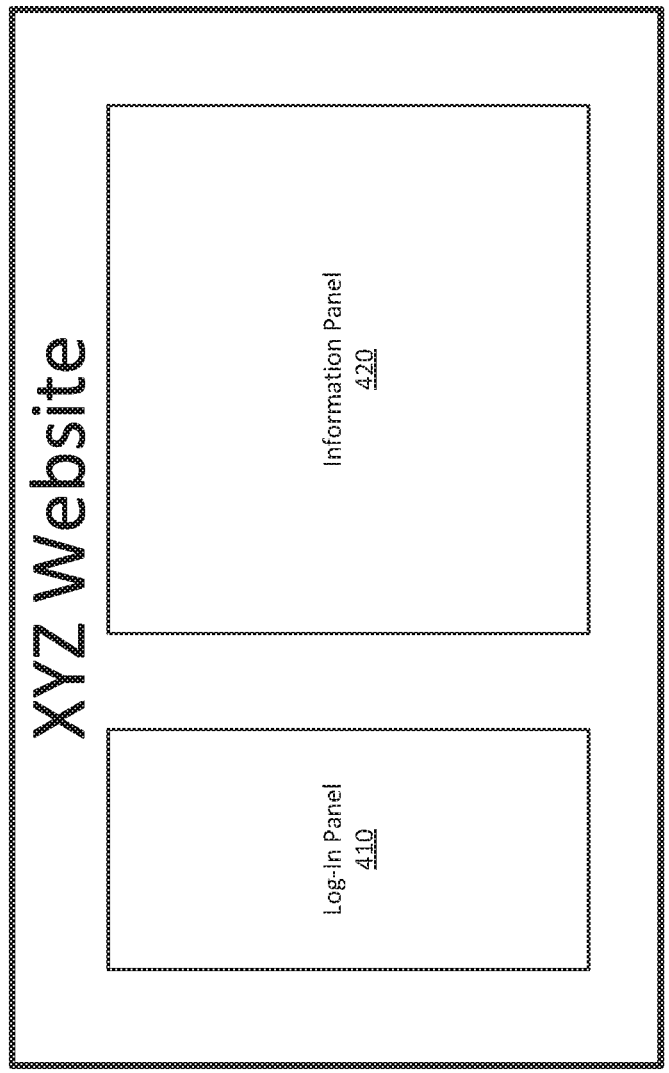
FIG. 4 is an illustration of a website screen in accordance with an embodiment of the present invention

FIG. 4 illustrates a website screen 400 in accordance with an embodiment of the present invention. The website screen 400 may be provided by the website server 120 and may be displayed on a display screen of one of the client devices 110 of FIG. 1. The website screen 400 may provide public information as well as restricted information. The restricted information may be provided via a login panel 310 where a user may be prompted to enter user credentials. The user credentials may be provided in any suitable form as known in the art, such as a username and password, biometrics (e.g., fingerprint), etc. In an embodiment, two-step authentication may be utilized to verify user credentials. Once the user credentials are verified, the website server 120 may allow access by the user to restricted information. And since the user has been verified, the website server 120 and analytics platform 130 may track the user's activities on the website and associate those user activities to the identified user. However, the user does not have to login to access an information panel 320 as well as other public sections of the website, and the user may browse the information panel 320 of the website 400 anonymously.

Figure 5:
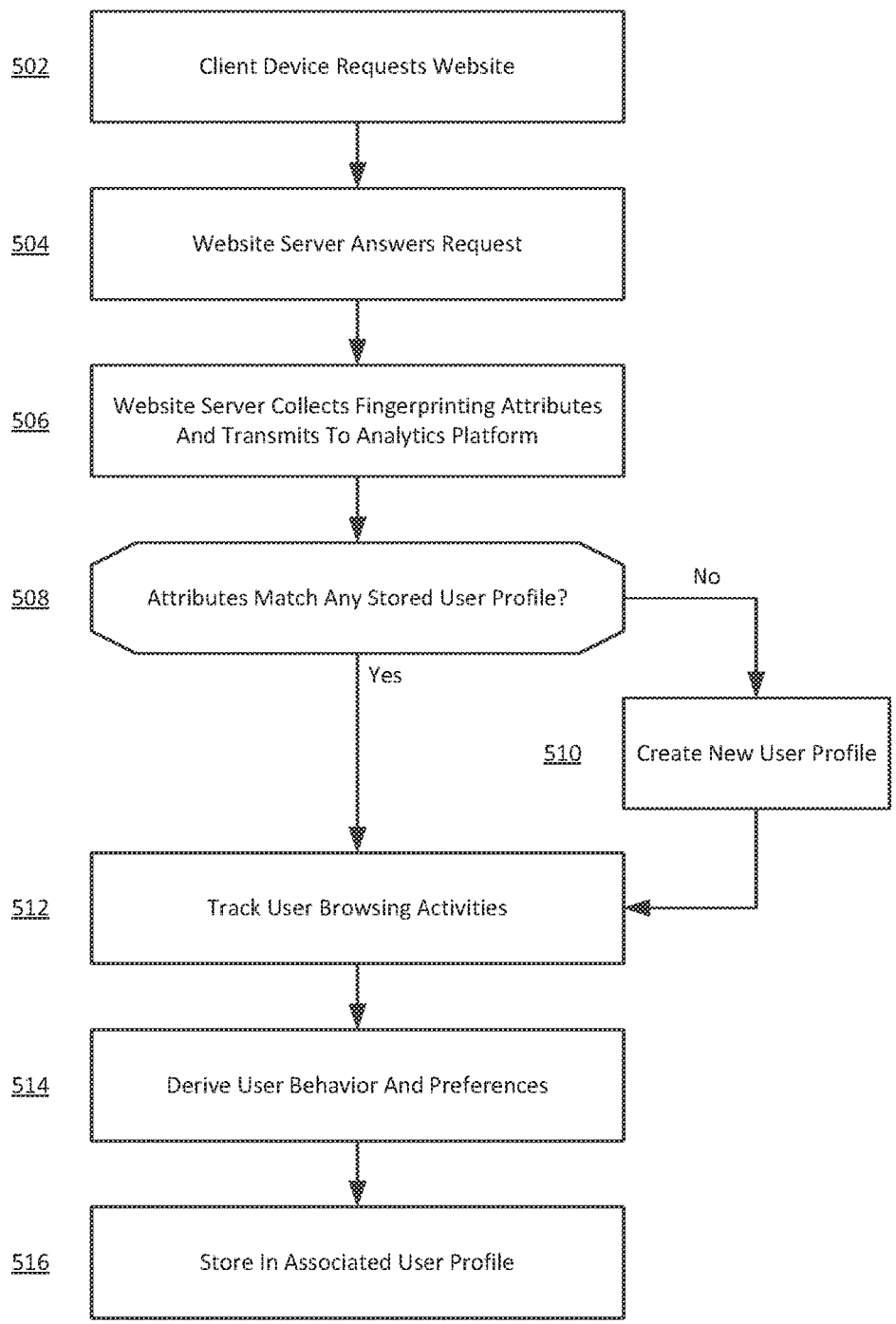
FIG. 5 is a flow diagram illustrating a method for a de-anonymization of a website visitor in accordance with an embodiment of the present invention.

FIG. 5 illustrates a flow diagram of a method to de-anonymize a website visitor and derive user behavior and preferences in accordance with an embodiment of the present invention. In step 502, a user from a client device may request a website. The user may do so using a browser on the client device or a mobile app or any other suitable technique as known in the art. In step 504, the website server may answer the request and transmit the website to the requesting client device. In this example, the user has not entered in any user credentials and therefore may browse the website anonymously.

In step 506, the website server may collect fingerprinting attributes from the client device and may provide the collected fingerprinting attributes to the analytics platform. In an embodiment, the website server may utilize a JavaScript library embedded in the website to extract the fingerprinting attributes from the client device without any action being taken by the user. The collected information may include various attributes.

For example, the collected attributes may include information regarding a UserAgent, such as the browser type and version, browser engine and version, operating system (OS) type and version, device type and vendor, etc. The collected information may also include attributes regarding screen settings including Screen Print, screen resolution, available resolution, color depth, pixel density (X DPI, Y DPI). The collection information may include attributes such as Language settings and Timezone of where the client device is located. Other collected information may include user settings on the client device such as whether cookies have been enabled, whether Java has been enabled, whether the browser has indexedDB, whether the browser has openDB, whether Flash has been enabled, whether Silverlight has been enabled, whether DoNotTrack has been enabled, whether other browser-specific options (e.g., AddBehavior for Internet Explorer) have been enabled, the identity of installed fonts (if any), Canvas fingerprinting, WebGL fingerprinting, browser plugin list, whether AdBlock has been enabled, Mime types, and whether the client has customized options such as languages, screen resolution, etc. Further, collected information may include characteristics of the client device such as CPU class, platform type, availability of session storage, availability of local storage, touchscreen detection and capabilities. In an embodiment, fingerprinting attributes may also include location information based on geo-location information from the client device. In an embodiment, cookies may also be used with fingerprinting attributes. The above examples of collected fingerprinting attributes are listed for illustration purposes and are not meant to be limited or exclusive.

In step 508, the analytics platform may compare the collected fingerprinting attributes to attributes in stored user profiles. If no match is found, the analytics platform, in step 510, may create a new user profile with the collected fingerprinting attributes. In an embodiment, matching of user profiles may utilize a fingerprint-to-user ratio and a user-to-fingerprint ratio, which may be recalibrated with accumulation of statistical data.

If a match is found or after a new user profile is created, in step 512, user's browsing activity on the website (as well as other websites) may be tracked. Tracked activities may include, but are not limited to, user clicks, views, scrolling, etc.

In step 514, the analytics platform, from the tracked user activities, may derive user preferences and behavior patterns. For example, if the tracked activities show user selecting information regarding different saving accounts for a financial website, the analytics platform may derive a user preference for savings accounts. In step 516, the analytics platform may store the derived preferences and behavior patterns in the associated user profile.

In an embodiment, the fingerprint identification and user tracking techniques described herein may be conducted across a set of websites. For instance, a user may be associated with a user profile when browsing a first website of a set of participating websites, and that user's activities may be tracked across the set of websites. From the tracked information, user preferences and behavior patterns may be derived and the correlated user profile may be updated accordingly.

Figure 6:
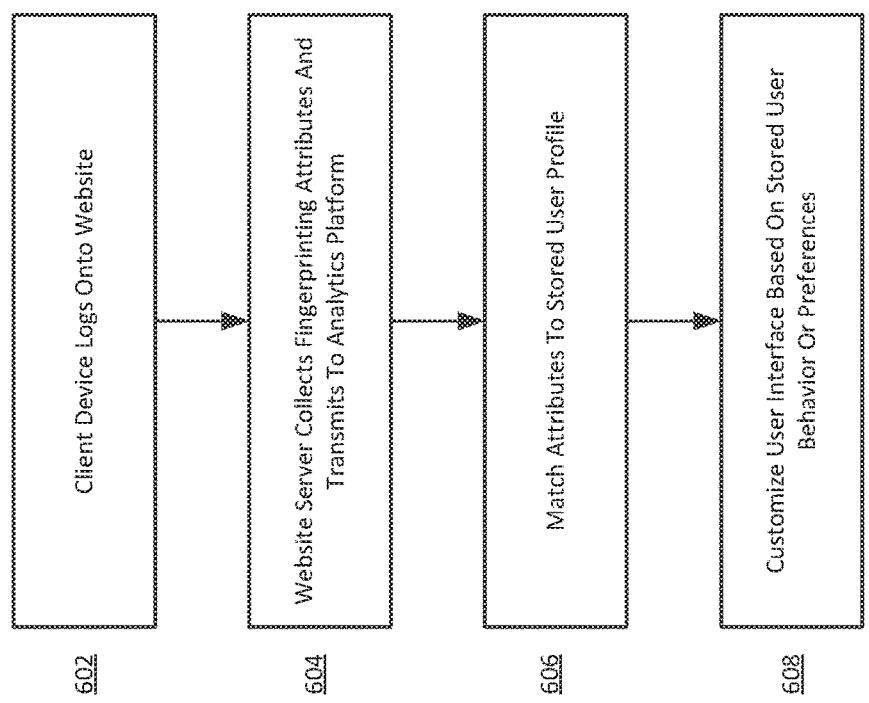
FIG. 6 is a flow diagram illustrating a method for customization of a user interface in accordance with an embodiment of the present invention.

FIG. 6 illustrates a flow diagram of a method to customize a user interface in accordance with an embodiment of the present invention. In step 602, a client device logs onto a website with user credentials. The website may be one of a set of participating websites as discussed above. In an embodiment, the login session may be for a transaction processing application. The website server may verify the user's credentials to allow access to restricted information on the website. In step 604, the website server may collect fingerprinting attributes from the client device and may provide the collected fingerprinting attributes to the analytics platform. In an embodiment, the website server may utilize a JavaScript library embedded in the website to extract the fingerprinting attributes from the client device without any action being taken by the user. The collected information may include various attributes, such as those described above with reference to FIG. 5.

In step 606, the analytics platform may compare the collected fingerprinting attributes to attributes in stored user profiles and match the attributes to a user profile. For example, if a user, using a client device, visited the website (or another website in the set of participating websites) previously and browsed the website anonymously (i.e., without logging in with user credentials), that user profile associated with the earlier visit may be matched now with the current login session. In step 608, a customized user interface may be created based on the stored user preferences and behavior patterns in the matched user profile. Also, the user activities of the signed on user may be tracked and used to update the user profile.

In an embodiment, different modes and techniques may be employed to identify a user. In an embodiment, a user may only browse public websites; therefore, the analytics server may use fingerprinting attributes collected across one more websites to identify the anonymous user by aggregating the statistical data. In another embodiment, the user, in addition to browsing public websites, may login to a website for restricted access; therefore, the analytics server may de-anonymize the user by associating his/her collected fingerprinting with login credentials. In another embodiment, cookies may be used in addition to the fingerprinting techniques described above. For example, when a browser is upgraded, the fingerprinting attributes for the device may change; however, cookies may be used to correlate the old and new fingerprinting attributes and de-anonymize the user.

FIG. 7 illustrates a customized website screen 700 in accordance with an embodiment of the present invention. The customized website screen 700 may be provided by the website server 120 and may be displayed on a display screen of one of the client devices 110 in a login session. The customized website screen 700 may include general panel 710 and a plurality of customized panels 720.1-720.N. The customized panels 720.1-720.N may be created based on the stored user preferences and behavior patterns in the matched user profile. That user profile may have been created and updated based on tracked activities of the user browsing the website(s) anonymously (i.e., without logging with user credentials) as well as the user activities during login sessions. For example, the customized panels 720.1-720.N may display sales recommendation or advertisements tailored specifically for the user based on the information from the user profile.

Moreover, the techniques described herein may be used to discover relationships among users. For example, there is a high probability that the same user uses the same client device and browser/application to access online resources. If multiple users, however, are detected logging in from the same client device, via the fingerprinting attribute techniques described herein, then those users may be linked together with an interpersonal relationship in each of their user profiles. Moreover, the relationship may be further defined by the type of client device. For example, friends and family typically may share a computer; however, sharing a mobile device, such as a phone, may indicate a closer relationship. And the closer the interpersonal relationship, the more likely the associated users may share similar interests. Therefore, derived information for one user may also be used for other linked users.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

It should also be readily apparent to one of ordinary skill in the art that the presently disclosed invention may be implemented in a wide range of industries. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. An analytics server, comprising:
a computer memory storing instructions and user profiles;
a processor executing the stored instructions in the computer memory, and performing steps including:
receiving collected client device fingerprinting attributes from a website server over a network when a client device browses a website without entering user credentials;
comparing the client device fingerprinting attributes to stored user profiles;
if the client device fingerprinting attributes match one of the stored user profiles, then associating a current browsing session with the matched user profile;
if the client device fingerprinting attributes do not match one of the stored user profiles, then creating a new user profile and associating the current browsing session with the new user profile;
tracking user activity in the current browsing session;
deriving user preferences from the tracking user activity;
storing the user preferences in the associated user profile to be used to create a customized user interface for a user login session, wherein the login session is initiated by a first user inputting user login credentials; and
upon a user login with the user login credentials, associating the client device fingerprinting attributes with the user login credentials, wherein when the client device subsequently browses the website without the first user entering the user login credentials, the subsequent browsing session is still associated with the user login credentials,
wherein the associated user profile includes information derived from another user profile that corresponds to a second user who was identified as using the client device, the derived information including information that relates to an interpersonal relationship between the first user and the second user.

2. The analytics server of claim 1, further including the step of extracting user preferences from the matched user profile, wherein the extracted user preferences are used to create the customized user interface for the first user.

3. The analytics server of claim 1, wherein a script library embedded in the website collects the client device fingerprinting attributes.

4. The analytics server of claim 3, wherein the client device fingerprinting attributes include information regarding a User Agent.

5. The analytics server of claim 3, wherein the client device fingerprinting attributes include information regarding user settings on the client device.

6. The analytics server of claim 3, wherein the client device fingerprinting attributes include geo-location information.

7. A method comprising:
receiving collected client device fingerprinting attributes from a website server over a network when a client device browses a website without entering user credentials;
comparing the client device fingerprinting attributes to stored user profiles;

if the client device fingerprinting attributes match one of the stored user profiles, then associating a current browsing session with the matched user profile;

if the client device fingerprinting attributes do not match one of the stored user profiles, then creating a new user profile and associating the current browsing session with the new user profile;

tracking user activity in the current browsing session;

deriving user preferences from the tracked user activities;

storing the user preferences in the associated user profile to be used to create a customized user interface for a user login session, wherein the login session is initiated by a first user inputting user login credentials; and upon a user login with the user login credentials, associating the client device fingerprinting attributes with the user login credentials, wherein when the client device subsequently browses the website without the user entering the user login credentials, the subsequent browsing session is still associated with the user login credentials, wherein the associated user profile includes information derived from another user profile that corresponds to a second user who was identified as using the client device, the derived information including information that relates to an interpersonal relationship between the first user and the second user.

8. The method of claim 7, further comprising:

extracting user preferences from the matched user profile, wherein the extracted user preferences are used to create the customized user interface for the first user.

9. The method of claim 7, wherein a script library embedded in the website collects the client device fingerprinting attributes.

10. The method of claim 9, wherein the client device fingerprinting attributes include information regarding a User Agent.

11. The method of claim 9, wherein the client device fingerprinting attributes include information regarding user settings on the client device.

12. The method of claim 9, wherein the client device fingerprinting attributes include geo-location information.

13. A device, comprising:

an input device to enter a first request for browsing a website without entering user credentials;

a processor, in a browsing session related to the first request, to transmit fingerprinting attributes of the device over a network, wherein transmitted fingerprinting attributes are stored in a user profile;

a second request for browsing the website with entering user credentials, wherein the fingerprinting attributes of the first request are associated with the user credentials provided in the second request, such that when the device subsequently browses the website without a first user entering the user login credentials, the subsequent browsing session is still associated with the user login credentials, and a display, in a browsing session related to the second request, to display a customized user interface based on the user profile, wherein the associated user profile includes information derived from another user profile that corresponds to a second user who was identified as using the device, the derived information including information that relates to an interpersonal relationship between the first user and the second user.

14. The device of claim 13, wherein a script library embedded in the website collects the fingerprinting attributes.

15. The device of claim 14, wherein the device fingerprinting attributes include information regarding a User Agent.

16. The device of claim 14, wherein the device fingerprinting attributes include information regarding user settings on the device.

17. The device of claim 14, wherein the device fingerprinting attributes include geo-location information.

* * * * *